United States Patent
Nakata et al.

(10) Patent No.: US 7,402,828 B2
(45) Date of Patent: Jul. 22, 2008

(54) POSITION DETECTOR THAT PREVENTS ERRONEOUS DETECTION OF A SCALE AND LIQUID EJECTING APPARATUS INCORPORATING THE SAME

(75) Inventors: Satoshi Nakata, Tokyo (JP); Hitoshi Igarashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/540,479

(22) Filed: Sep. 28, 2006

(65) Prior Publication Data

US 2007/0076259 A1 Apr. 5, 2007

(30) Foreign Application Priority Data

Sep. 28, 2005 (JP) ............................. 2005-281515

(51) Int. Cl.
- *G01N 15/06* (2006.01)
- *G01N 21/49* (2006.01)
- *G01N 21/85* (2006.01)

(52) U.S. Cl. ...................... 250/573; 250/237 R; 347/20; 347/23; 347/37

(58) Field of Classification Search ................................
250/231.13–231.18, 237 R, 237 G, 573, 250/574, 214 PR; 347/20, 23, 37; 341/11, 341/13, 31; 359/436–442; 33/1 PT, 1 N
See application file for complete search history.

(56) References Cited

U.S. PATENT DOCUMENTS

2004/0238725 A1* 12/2004 Ornellas et al. ............. 250/221

FOREIGN PATENT DOCUMENTS

| JP | 2000241198 A * | 9/2000 |
| JP | 2004-202963 | 7/2004 |
| JP | 2005-81691 | 3/2005 |

* cited by examiner

*Primary Examiner*—Georgia Y. Epps
*Assistant Examiner*—Francis M Legasse, Jr.
(74) *Attorney, Agent, or Firm*—John J. Penny, Jr.; Edwards Angell Palmer & Dodge LLP

(57) ABSTRACT

A liquid ejecting head is operable to eject liquid toward a target medium. A light emitter is operable to emit light. A light receiver is adapted to receive the light emitted from the light emitter, and operable to output a signal in accordance with an amount of the received light, thereby detecting a position of the liquid ejecting head. A transparent member is elongated in a first direction and disposed between the light emitter and the light receiver. A line pattern is provided with the transparent member so as to oppose the light emitter, and including light transmitting sections and light shielding sections which are alternately arranged in the first direction with a first pitch. Each of the light transmitting sections is adapted to allow the light emitted from the light emitter to pass through. Each of the light shielding sections is adapted to shield the light emitted from the light emitter. A width of each of the light transmitting sections in the first direction varies relative to a second direction perpendicular to the first direction. The light receiver includes a substrate elongated in the first direction. A plurality of light receiving elements are arrayed on the substrate in the first direction such that positions of adjacent light receiving elements relative to the second direction are made different in accordance with the width of each of the light transmitting sections.

6 Claims, 7 Drawing Sheets

POSITION DETECTOR THAT PREVENTS ERRONEOUS DETECTION OF A SCALE AND LIQUID EJECTING APPARATUS INCORPORATING THE SAME

BACKGROUND

1. Technical Field

The present invention relates to a position detector, and a liquid ejecting apparatus incorporating the same.

2. Related Art

In an ink jet printer, a carriage and a printed subject such as paper are driven by a motor. Incidentally, in order to perform position control and speed control, an encoder is generally used. The encoder includes a photo sensor and a scale. The photo sensor includes a light emitting element and a light receiving element the scale includes a light transmitting section which transmits light emitted from the light emitting element, and a light shielding section which shields light emitted from the light emitting element. These light transmitting section and light shielding section are repetitively arranged at a fixed pitch to form an array (hereinafter, referred to as an light receiving element array).

In such the encoder, recently, there is a problem of attachment of ink mist. Namely, recent printers which perform printing with high precision can eject minute ink droplets from a printing head. These minute ink droplets readily become ink mist and drift inside the printer. Therefore, as such the printer is used for a while, solidified ink mist is piled on the scale.

Japanese Patent Publication No. 2005-81691A (JP-A-2005-81691) teaches that a partition member is arranged between a carriage belt and a scale to prevent the attachment of the ink mist onto the scale. Japanese Patent Publication No. 2004-202963A (JP-A-2004-202963) discloses a configuration for correcting, in a case where duty factor of a signal outputted from a light receiving element decreases due to the attached ink mist, the duty factor of the output signal so as to become 50%.

Incidentally, the light emitting element is arranged such that the optical axis thereof is located at the center of the light receiving element array. With such an arrangement, when light passes through the light transmitting section of the scale at the end of the array of the light receiving elements, the light travels in a direction oblique with respect to the optical axis. Therefore, there is an increase in the percentage of the light having passed through the light transmitting section of the scale being received not by a light receiving element opposing the light transmitting section but by a light receiving element adjacent thereto, which is covered with a light shielding section.

As mentioned above, when there is increased the quantity of light entering the light receiving element covered with the light shielding section at the end of the light receiving element array, an accurate encoder signal cannot be obtained, which in turn induces a detection failure. When ink mist has adhered to the light transmitting section as mentioned above, there may arise a case where diffraction of light or the like is induced by adhesion of ink mist. Accordingly, a detection failure becomes more likely to arise.

In JP-A-2005-81691, the flow of ink mist is restricted by placing a partition member, to thus prevent adhesion of ink mist to the scale. However, this document does not disclose any means effective for preventing the light receiving element covered with a light shielding section from receiving undesired light (i.e., a detection failure).

JP-A-2004-202963 discloses a configuration for correcting a signal. However, this document does not disclose any means effective for preventing the light receiving element covered with the light shielding section from receiving undesired light either.

SUMMARY

It is an advantage of some aspects of the invention to provide a position detector capable of inhibiting a light receiving element covered with a light shielding section from receiving undesired light, to thus prevent erroneous detection of a scale, as well as providing a liquid ejecting apparatus incorporating such a position detector.

According to one aspect of the invention, there is provided a liquid ejecting apparatus, comprising:

a liquid ejecting head, operable to eject liquid toward a target medium;

a light emitter, operable to emit light;

a light receiver, adapted to receive the light emitted from the light emitter, and operable to output a signal in accordance with an amount of the received light, thereby detecting a position of the liquid ejecting head;

a transparent member, elongated in a first direction and disposed between the light emitter and the light receiver;

a line pattern, provided with the transparent member so as to oppose the light emitter, and including light transmitting sections and light shielding sections which are alternately arranged in the first direction with a first pitch, wherein:

each of the light transmitting sections is adapted to allow the light emitted from the light emitter to pass through;

each of the light shielding sections is adapted to shield the light emitted from the light emitter;

a width of each of the light transmitting sections in the first direction varies relative to a second direction perpendicular to the first direction; and the light receiver comprises:

a substrate, elongated in the first direction; and a plurality of light receiving elements, arrayed on the substrate in the first direction such that positions of adjacent light receiving elements relative to the second direction are made different in accordance with the width of each of the light transmitting sections.

With the above configuration, the light blocked by the light shielding section changes according to positions in the first direction. Therefore, the quantity of light received by the light receiving elements varies according to positions in the first direction. As a result, the light receiving elements receiving a large quantity of light and the light receiving elements receiving a small quantity of light coexist, and an electrical signal responsive to a position in the first direction can be output.

The width of each of the light transmitting sections may be reduced as being closer to a first end of the transparent member-than a second end of the transparent member relative to the second direction. The light receiving elements may be arranged so as to be closer to the first end of the transparent member than the second end of the transparent member, as being closer to an end of the transparent member than a center of the transparent member relative to the first direction.

In this case, the quantity of light passing through the light transmitting section can be reduced at the position where light obliquely propagating from the light emitter is increased (e.g., the end in the first direction). Therefore, the quantity of light received by the light receiving element, which is adjacent to the light receiving element covered with the light transmitting section and covered with the light shielding section and which is not originally to receive light, can be diminished. Further, the detection sensitivity of the light receiving element can be enhanced by reducing the quantity of light received by the light receiving elements covered with the light shielding section, so that the accuracy of detection of an electrical signal output from the light receiving elements can be enhanced.

The width of each of the light transmitting sections may be proportionally reduced.

A shape of each of the light transmitting sections may assume an isosceles triangle or a right-angled triangle.

The first pitch may correspond to a dimension in the first direction of an odd number of the light receiving elements.

In this case, at least one of the light receiving elements 66 must be associated with each of the light transmitting sections 54a and the light shielding sections 54b. Accordingly, among these light receiving elements, the signals in which the phase is shifted by 180 degrees can be outputted, and it is possible to obtain an encoder signal having high accuracy by comparison between these signals.

The liquid may be pigment-base ink.

In this case, the reception of the excessively diffused or diffracted light can be suppressed even when the pigment-base ink which tends to cause the light diffraction is attached onto the transparent member.

BRIEF DESCRIPTION OF THE DRAWINGS

The invention will be described with reference to the accompanying drawings, wherein like numbers reference like elements.

DESCRIPTION OF EXEMPLARY EMBODIMENTS

A position detector according to one embodiment of the invention and a printer 10 using this position detector will be described below with reference to FIGS. 1 to 10. The printer 10 in the embodiment is an ink jet type printer. However, such the ink jet printer, as long as it can eject ink to perform printing, may adopt any ejection method.

In the following description, a "downside" indicates a side on which the printer 10 is placed, and an "upside" indicates a side apart from the side on which the printer 10 is placed. A direction where a carriage 31 described later moves is taken as a primary scanning direction, and a direction which is orthogonal to the primary scanning direction and where a printed subject P is transported is taken as a secondary scanning direction.

Figure 1:
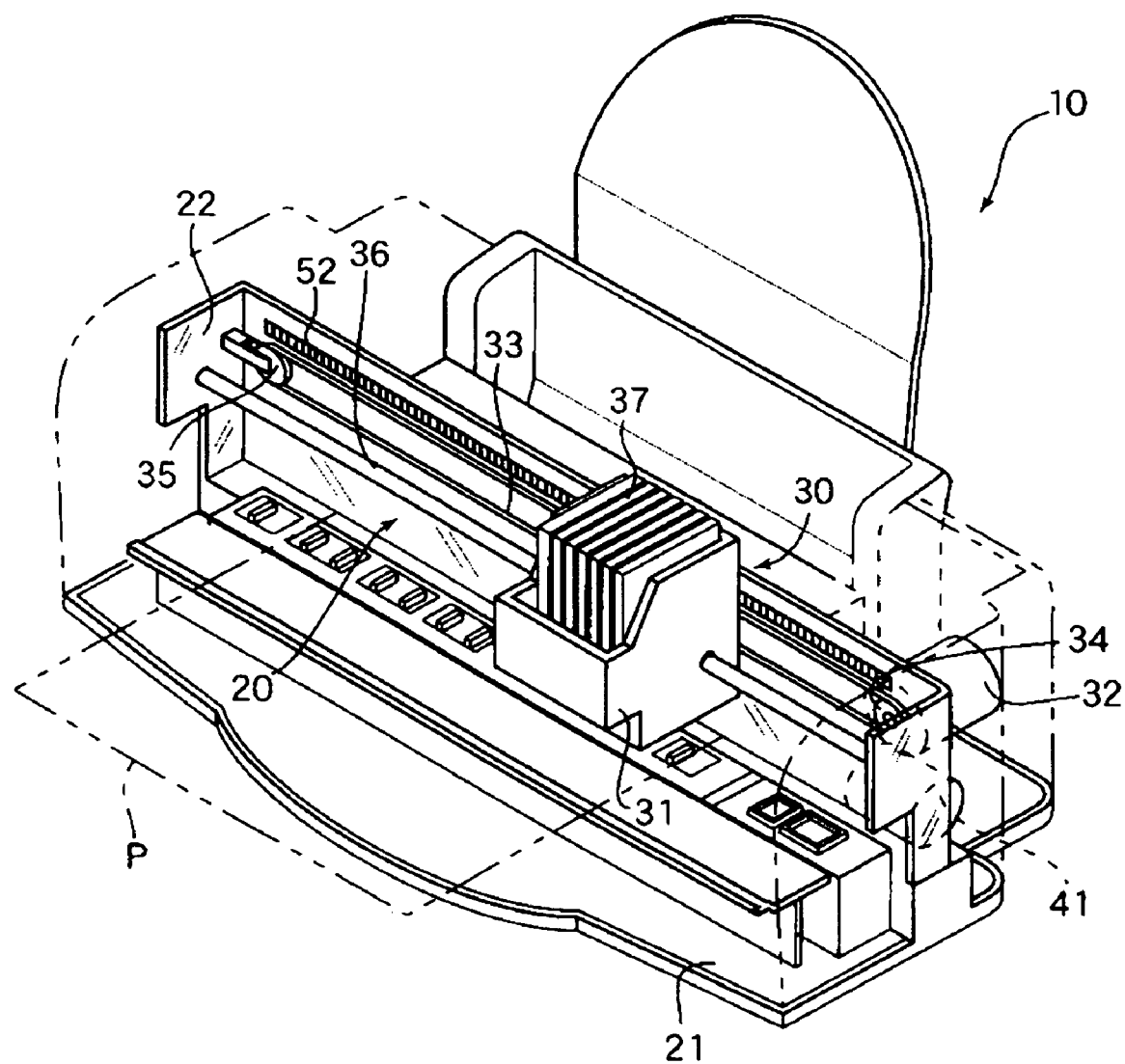
FIG. 1 is a perspective view of a printer incorporating a position detector according to one embodiment of the invention.
Figure 2:
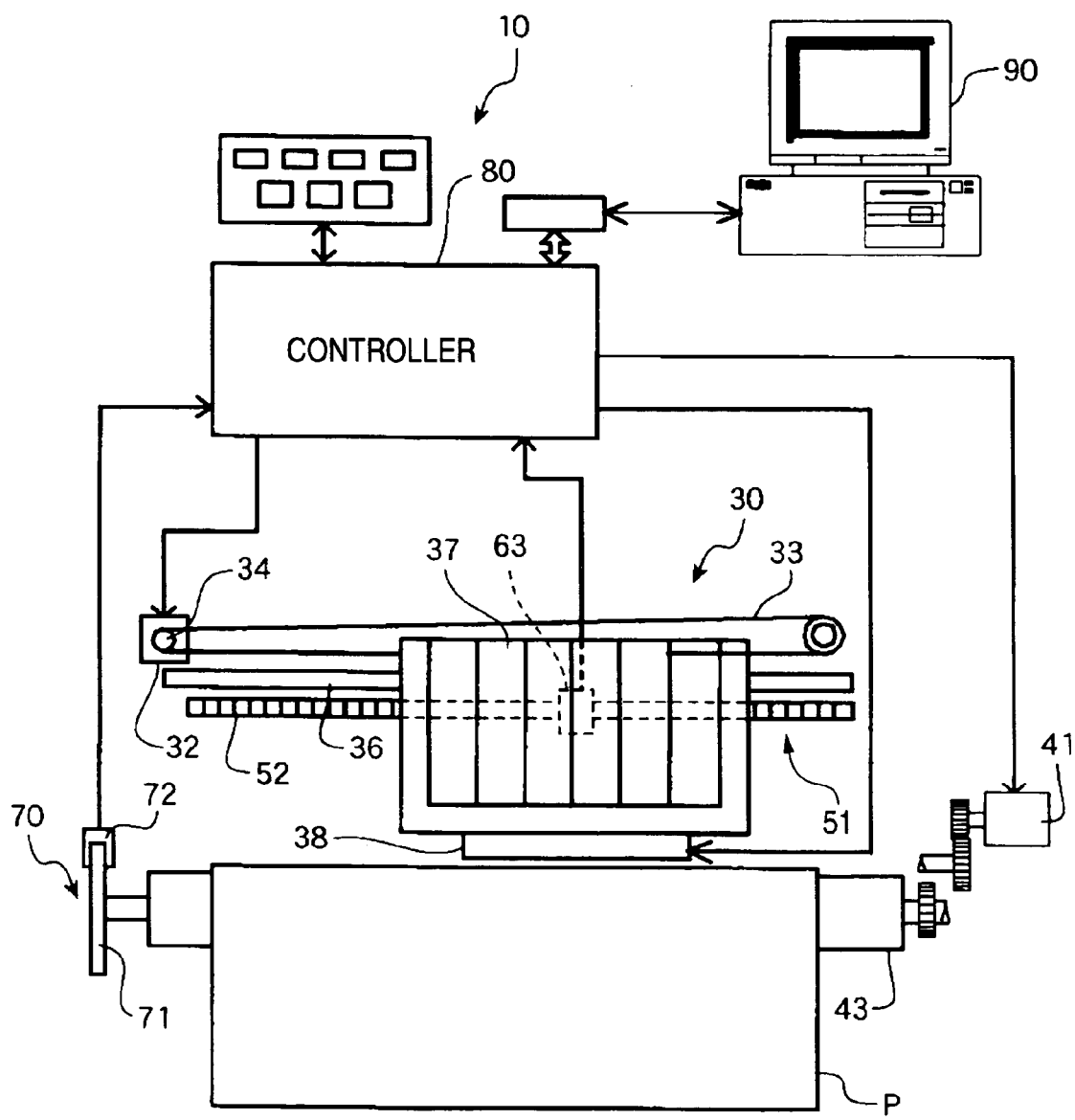
FIG. 2 is a schematic view showing a motor driving control system in the printer.
Figure 3:
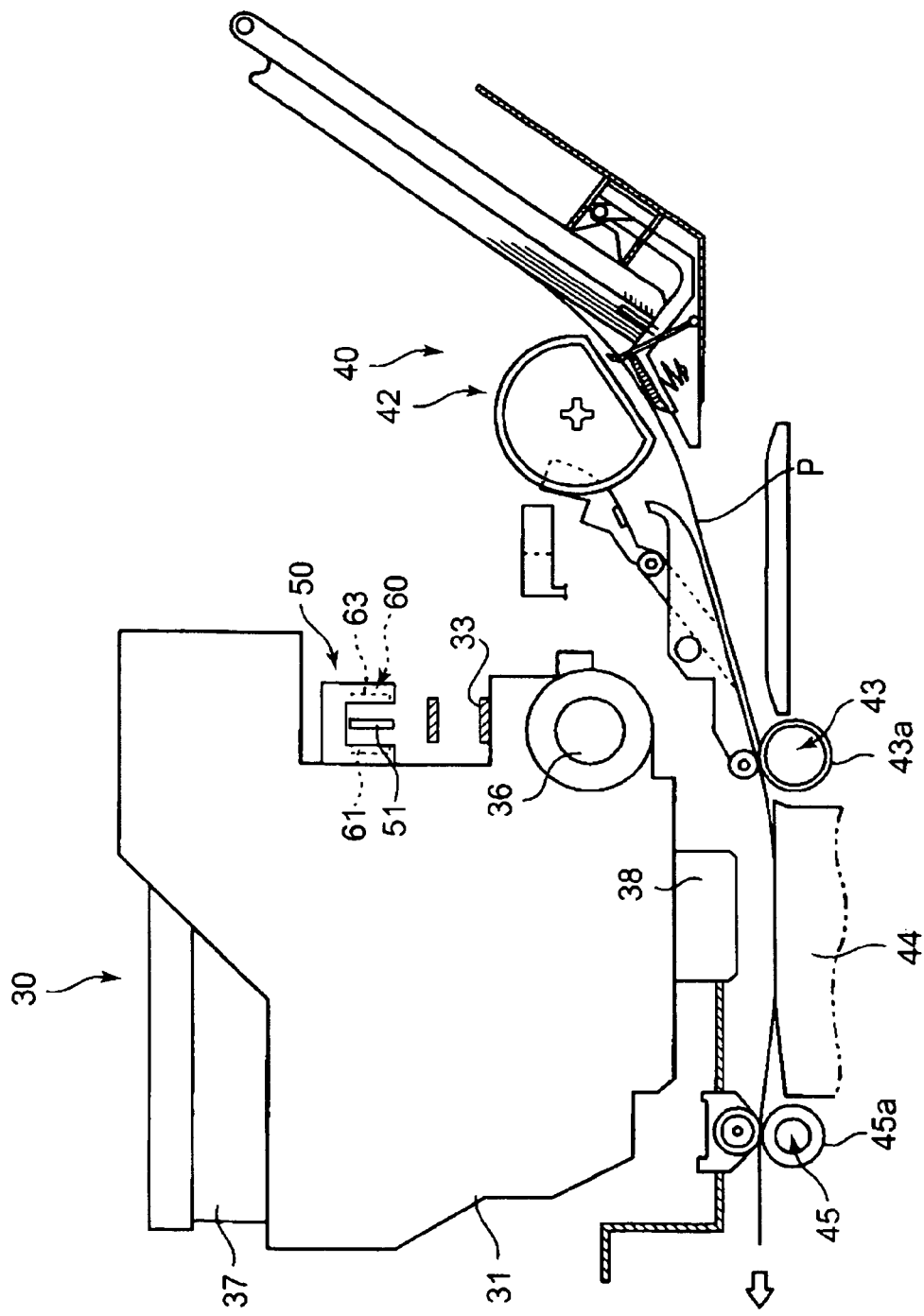
FIG. 3 is a schematic section view showing a sheet transporting system in the printer.

As shown in FIGS. 1 to 3, the printer 10 comprises a housing 20, a carriage driving mechanism 30, a sheet transporting mechanism 40, a linear encoder 50, a rotary encoder 70, and a controller 80.

The housing 20 includes a chassis 21 placed on an installation surface, and a supporting frame 22 provide upright which extends from this chassis 21 upward. The carriage driving mechanism 30 includes a carriage 31, a carriage motor 32, a belt 33, a driving pulley 34, a follower pulley 35, and a carriage shaft 36. On the carriage 31, an ink cartridge 37 can be mounted. As shown in FIG. 2, on the lower face of the carriage 31, a printing head 38 which can eject ink droplets is provided. The belt 33 is an endless belt, and its part is fixed onto the rear face of the carriage 31. This belt 33 is stretched between the driving pulley 34 and the follower pulley 35.

The above printing head 38 is provided with not-shown nozzle arrays corresponding to each color of ink. In nozzles constituting this nozzle array, not-shown piezoelectric elements are arranged. By the operation of this piezoelectric element, the ink droplet can be ejected from the nozzle that is located at the end portion of an ink passage. The printing head 38 is not limited to the piezoelectric type using the piezoelectric element, but may adopt, for example, a heater type which heats ink and utilizes power of the produced bubbles, a magnetostrictive type which uses a magnetostrictive element, or a mist type which controls mist by an electric field. The ink filled into the cartridge 37 may be any kind of ink, for example, dye-based ink or pigment-based ink.

As shown in FIG. 3, the sheet transporting mechanism 40 includes a motor 41 and a sheet feeding roller 42 for feeding a printed subject P such as plain paper (refer to FIG. 2). On the downstream side of the sheet feeding roller 42, a sheet transporting roller pair 43 for transporting the printed subject P nipped therebetween is provided. On the downstream side of the sheet transporting roller pair 43, a platen 44 and the above-mentioned printing head 38 are provided so as to be opposed to each other in the vertical direction. The platen 44 supports, from the downside, the printed subject P being transported below the printing head 38 by the sheet transporting roller pair 43. On the downstream side of the platen 44, a sheet ejecting roller pair 45 similar to the sheet transporting roller pair 43 is provided.

The driving force from the motor 41 is transmitted to a driving roller 43a in the sheet feeding roller pair 43 and a driving roller 45a in the sheet ejecting roller pair 45.

Figure 4:
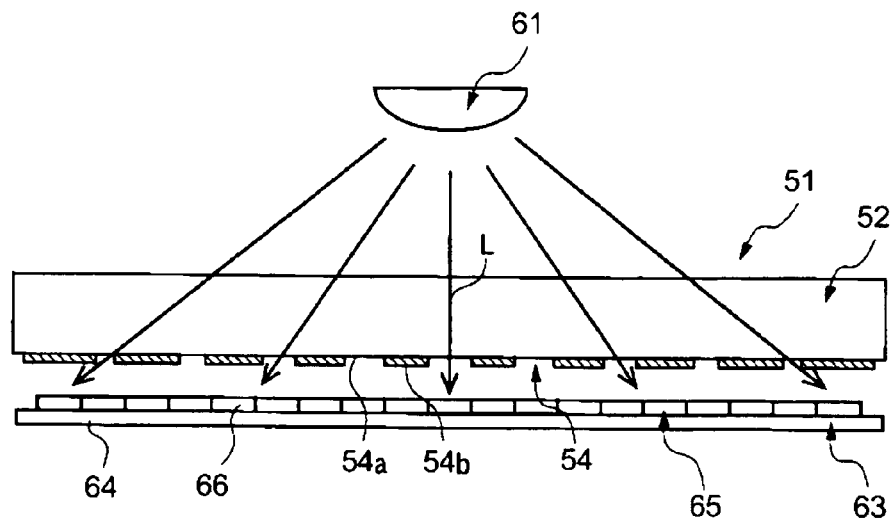
FIG. 4 is a schematic view showing a linear encoder in the printer.
Figure 5:
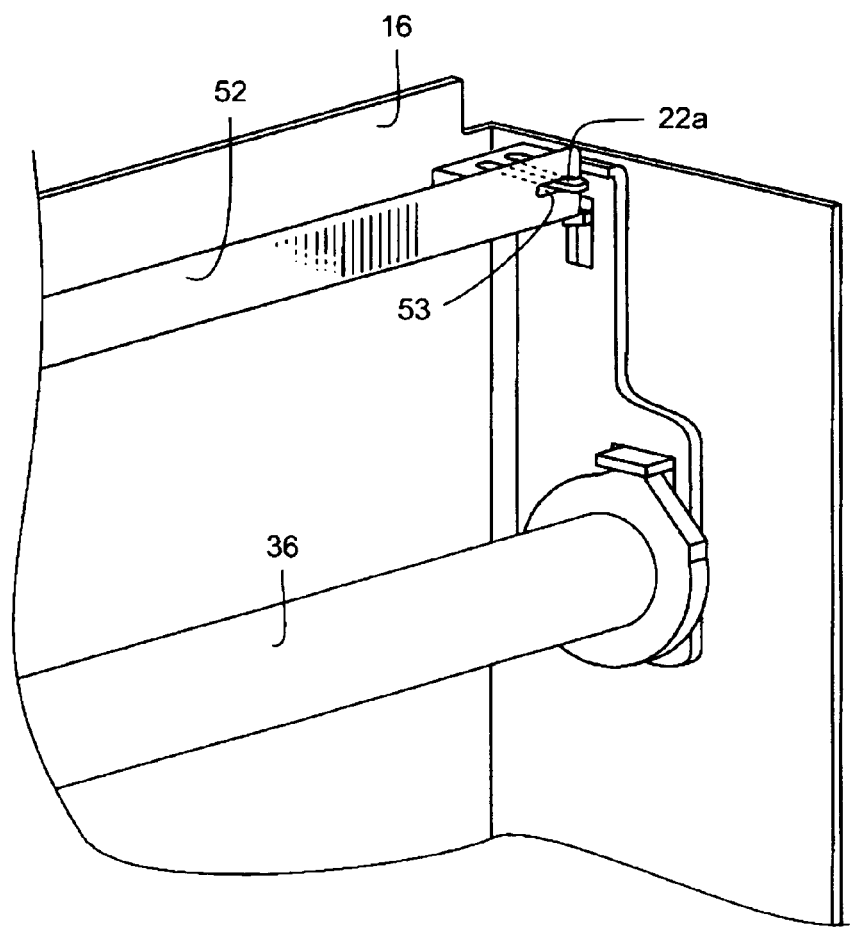
FIG. 5 is a perspective view showing a longitudinal end portion of a linear scale in the linear encoder.

As shown in FIG. 4, the linear encoder 50 includes a linear scale 51 and a photo sensor 60. The linear scale 51 is formed of an elongated transparent member 52 made of a transparent material such as PET (polyethylene terephthalate). However, other various materials can be applied as the transparent member. As shown in FIG. 5, holes 53 are formed at both longitudinal ends of the linear scale 51, and claws 22a provided on the supporting frame 22 are respectively inserted into the holes 53, so that the linear scale 51 is suspended between the claws 22a.

For convenience of description, of the transparent member 52, a surface facing a light emitter 61 (described later) will be described below as a front surface 52a, and a surface facing a light receiver 63 (described later) will be described as a back surface 52b.

As shown in FIG. 4, a line pattern 54 is formed on the linear scale 51. The line pattern 54 has a light transmitting section 54a for allowing transmission of light and a light shielding section 54b for blocking transmission of light. Of the line pattern 54, the light shielding section 54b is formed by providing the surface of the transparent member 52 with a black print having such a thickness as to prevent transmission of light. The light transmitting section 54a is not provided with a black print and allows transmission of light emitted from the light emitter 61.

Figure 6:
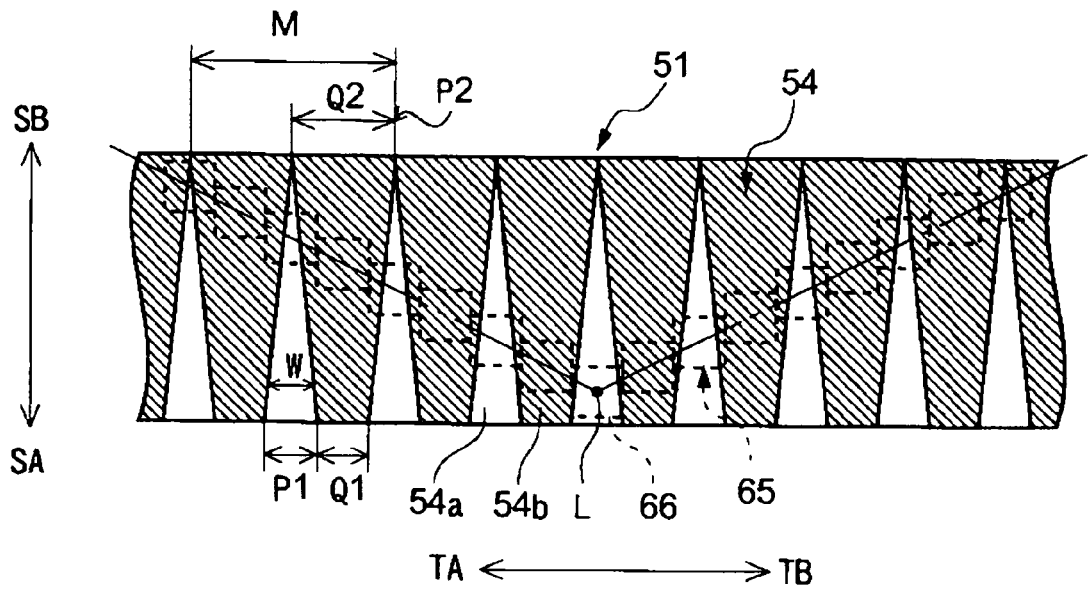
FIG. 6 is a diagram showing an arrangement of a line pattern on the linear scale and light receiving elements in the linear encoder.

As shown in FIG. 6, the line pattern 54 is provided in such a way that the widths of the light transmitting section 54a and the light shielding section 54b change from one end (an SA side in FIG. 6) of the transparent member 52 toward the other end of the same (an SB side in FIG. 6). More specifically, in the line pattern 54, the width P1 of the light transmitting section 54a on the SA side is substantially equal to the width Q1 of the light shielding section 54b. However, the width P2 of the light transmitting section 54a on the SB side becomes zero, so that a total of the width P1 and the width Q1 becomes equal to a width Q2 of the light shielding section 54b on the SB side. Therefore, the shape of the light transmitting section 54a in the plan view assumes a triangular shape, and the shape of the light shielding section 54b in the plan view assumes a trapezoidal shape.

With this configuration, the width W of the light transmitting section 54a proportionally decreases from the SA side to the SB side. In the following descriptions, a pitch at which the light transmitting section 54a and the light shielding section 54b are alternately iterated is called a mask pitch M. The mask pitch M is constant, and the rate of the width of the light transmitting section 54a to the width of the mask pitch M proportionally decreases from the SA side to the SB side.

Figure 7:
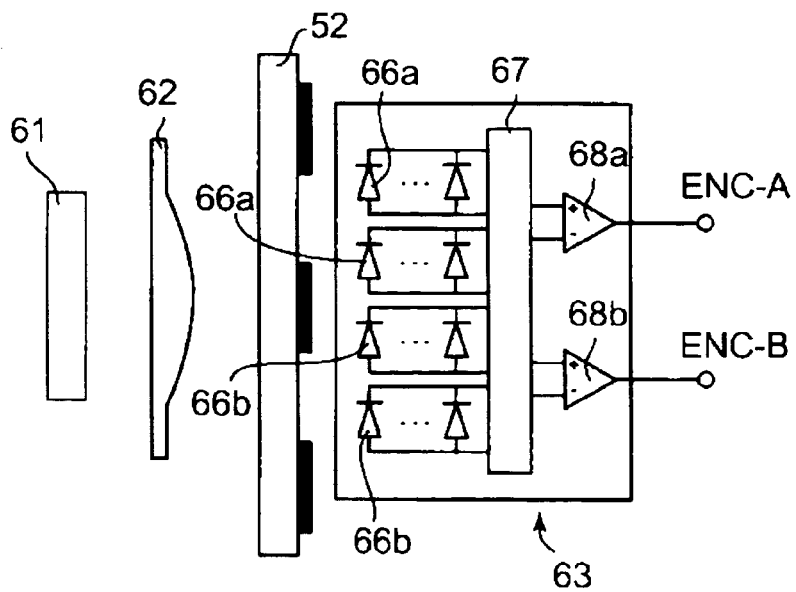
FIG. 7 is a diagram showing a detailed configuration of the linear encoder.

As shown in FIG. 7, the photo sensor 60 comprises a light emitter 61, a collimator lens 62, and a light receiver 63. These light emitter 61 and light receiver 63 are opposed to each other through the linear scale 51 located between the collimator lens 62 and the light receiver 63 in a non-contact manner. The light emitter 61 comprises a not-shown light emitting element such as a light emitting diode, and the light generated by this light emitting element is emitted toward the linear scale 51. The optical axis L of the light emitter 61 is preferably aligned with the center of the width W of one of the light transmitting sections 54a located in the longitudinal center of the transparent member 52.

Figure 8:
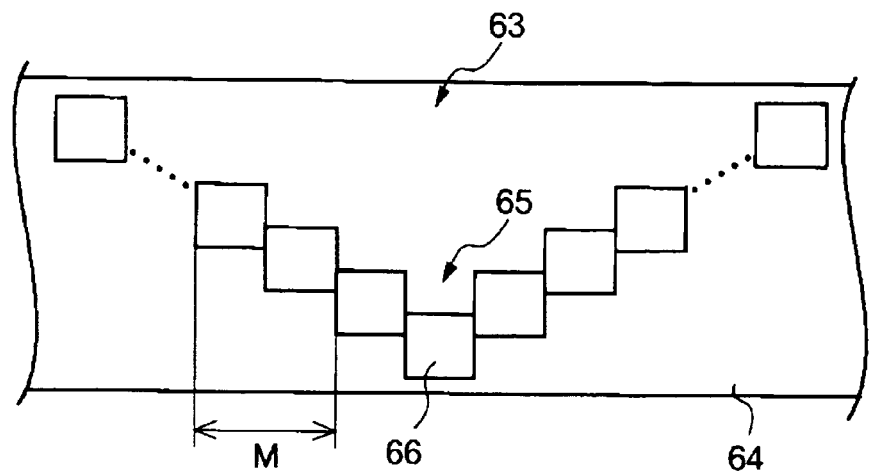
FIG. 8 is a schematic plan view of the light receiving elements.

As shown in FIGS. 4, 6, and 8, the light receiver 63 comprises a substrate 64, and a light receiving element array 65 in which a plurality of light receiving elements 66 arranged on the substrate 64. The light receiving element 66 is capable of converting the received light into an electric signal according to the quantity of the received light. A phototransistor, a photodiode, a photo-IC or the like may be adopted as the light receiving element.

As shown in FIG. 6, one of the light receiving elements 66 which is located in the vicinity of the optical axis L is situated on the SA side where the width of the light transmitting section 54a becomes maximum. The light receiving elements 66 are so arranged as to be close to the SB side as they depart from the optical axis L, and as to form a V-shaped array. Accordingly, the width of the light transmitting section 54a facing the light receiving element 66 becomes minimum at a longitudinal end of the transparent member 52. The longitudinal direction of the transparent member 52 is denoted by arrows TA and TB.

Figure 9:
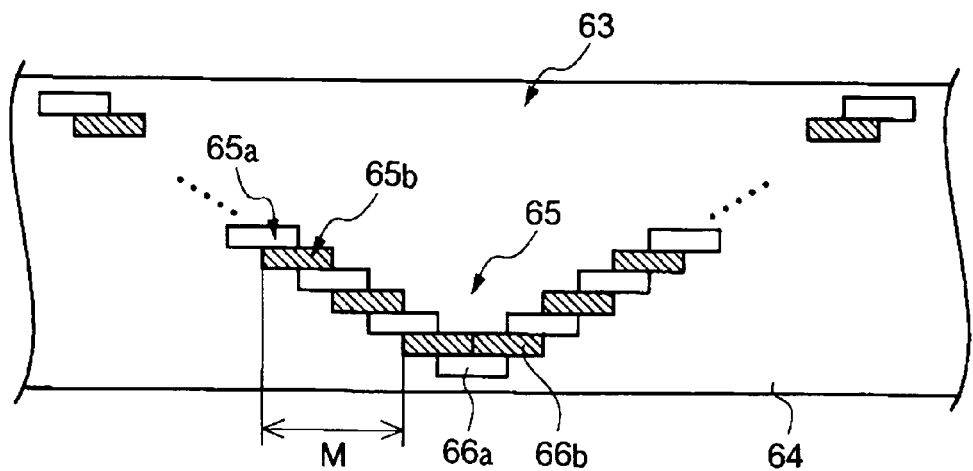
FIG. 9 is a schematic view showing a first modified example of the light receiving elements.

The light receiving element array 65 may be configured as shown in FIG. 9. In this example, the light receiving elements 66 include light receiving elements 66a used for outputting an encoder signal (ENC-A) of phase A and light receiving elements 66b used for outputting an encoder signal (ENC-B) of phase B, which are to be described later. The light receiving element 66a and the light receiving element 66b are arranged at the same pitch. Further, the width of two light receiving elements 66a or two light receiving elements 66b in the longitudinal direction of the substrate 64 correspond to the mask pitch M.

In this example, there are a light receiving element-array 65a formed by the light receiving elements 66a (unhatched ones) and a light receiving element array 65b formed by the light receiving elements 66b (hatched ones) which are shifted from each other in the longitudinal direction of the substrate 64 by a quarter of the mask pitch M. Accordingly, a phase difference existing between the pulse ENC-A output from the light receiving element array 65a and the pulse ENC-B output from the light receiving element array 65b becomes 90 degrees.

Figure 10:
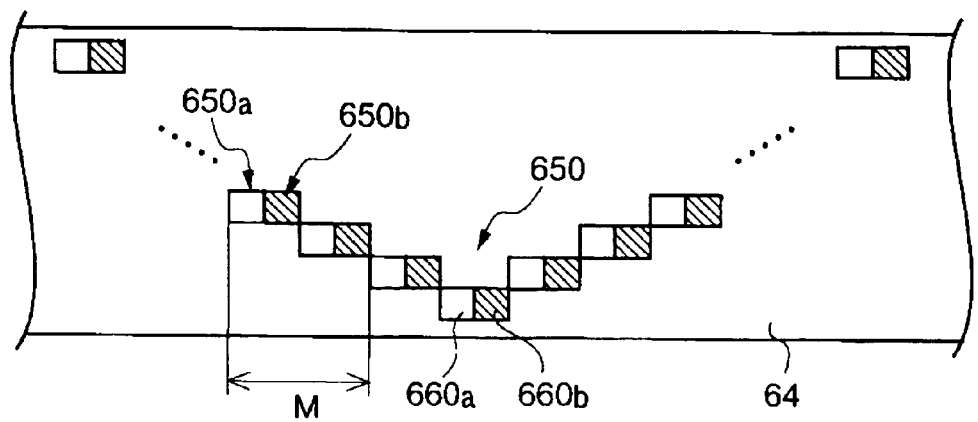
FIG. 10 is a schematic view showing a second modified example of the light receiving elements.

Further, the light receiving element array 65 may be configured as shown in FIG. 10. In this example, there are a light receiving element array 650a formed by light receiving elements 660a (unhatched ones) and a light receiving element array 650b formed by light receiving elements 660b (hatched ones). The light receiving element 660a has a half size of the light receiving element 66a relative to the longitudinal direction of the substrate 64, and the light receiving element 660b has a half size of the light receiving element 66b relative to the longitudinal direction of the substrate 64. Also in this example, the light receiving element array 650a and the light receiving element array 650b are shifted from each other in the longitudinal direction of the substrate 64 by a quarter of the mask pitch M. Accordingly, a phase difference existing between the pulse ENC-A output from the light receiving element array 650a and the pulse ENC-B output from the light receiving element array 650b becomes 90 degrees.

As shown in FIG. 7, the plural light receiving elements 66a and 66b are connected to a signal amplifier 67. Analog waveform signals outputted from the light receiving elements, after being amplified by this signal amplifier 67, are outputted to a first comparator 68a and a second comparator 68b. The first comparator 68a and the second comparator 68b output pulse waveform digital signals on the basis of the analog signals outputted through the signal amplifier 67 from the respective light receiving element arrays 65a and 65b.

In the example shown in FIG. 9, the light receiving element 66a in the light receiving element array 65a is connected to a positive terminal of the first comparator 68a, and the adjacent light receiving element 66a in the light receiving element array 65a is connected to a negative terminal of the first comparator 68a. The adjacent light receiving elements 66b in the light receiving array 65b are similarly connected to the second comparator 68b.

In the example shown in FIG. 10, the light receiving element 660a in the light receiving element array 650a is connected to a positive terminal of the first comparator 68a, and the adjacent light receiving element 660a in the light receiving element array 650a is connected to a negative terminal of the first comparator 68a. The adjacent light receiving elements 660b in the light receiving array 650b are similarly connected to the second comparator 68b.

Figure 11:
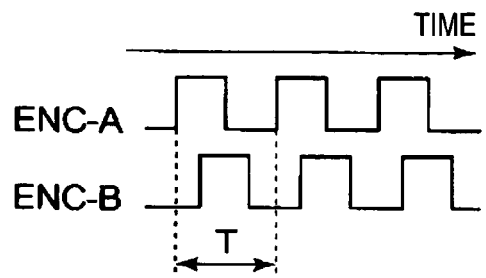
FIG. 11 is a timing chart showing signals outputted from the linear encoder.

For example, in a case where the level of the analog signal inputted to the positive terminal is higher than the level of the analog signal inputted to the negative terminal, a high-level signal is outputted. In the contrary case, a low-level signal is outputted. Hereby, it is possible to output pulse signals (ENC-A, ENC-B) as shown in FIG. 11, corresponding to detection by the light transmitting section 54a and the light shielding section 54b.

A pulse signal ENC-A is outputted from the first comparator 68a corresponding to the light receiving element array 65a, and a pulse signal ENC-B in which the phase is shifted by 90 degrees is outputted from the second comparator 68b corresponding to the light receiving element array 65b.

Figure 12:
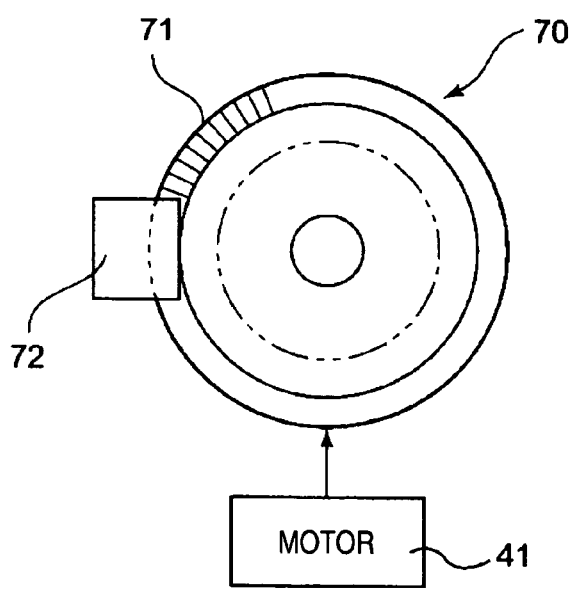
FIG. 12 is a schematic view showing a rotary encoder in the printer.

As shown in FIG. 12, the rotary encoder 70 comprises a disc-shaped scale 71 rotated by the motor 41, and a photo sensor 72 similar to the photo sensor 60 of the linear encoder 50. This rotary encoder 70 has the same constitution as that of the linear encoder 50 except that the scale 71 is formed in the shape of a disc. Therefore, the detailed description of the rotary encoder 70 is omitted.

As shown in FIG. 2, an encoder signal outputted from the linear encoder 50 or the rotary encoder 70, a print signal from a computer 90, and various output signals are inputted to a controller 80. More specifically, the controller 80 includes CPU, ROM, RAM, ASIC, a DC unit, and a driver to control the CR motor 32, the printing head 38, the motor 41, and the like.

When the printer 10 is operated under the above constitution, the operation performed by the linear encoder 50 will be described below.

When the linear encoder 50 is activated and the light emitter 61 emits the light toward the linear scale 51, the emitted light passes through the collimator lens 62, so that the light emergent from the collimator lens 62 becomes parallel light. However, the emergent light is not complete parallel light. Further, in the light receiving element 66 located at the end of the light receiving element array 65, a predetermined proportion of light having reached a front surface 52a of the transparent member 52 is not reflected by the front surface 52a and remains propagating through the inside of the transparent member 52. Such light reaches the light transmitting section 54a or the light shielding section 54b on a back surface 52b of the transparent member 52.

When light passed through the light transmitting section 54a is received by any one of the light receiving elements 66, in accordance with the detection state of the light receiving elements, analog signals are outputted according to the amount of the detected light, and thereafter the pulse signal ENC-A and the pulse signal ENC-B that are the digital signals are outputted respectively through the first comparator 68a and the second comparator 68b.

In accordance with the pulse signals ENC-A and ENC-B, the controller 80 drives the motor 41 one pitch by one pitch, and controls the carriage motor 32 while detecting the position of the carriage 3. Further, the controller 80 generates a print signal for controlling ink ejection from the print head 38, thereby performing printing with respect to the printed medium P. An analog signal responsive to the incident light is output according to the amount of incident light. After the analog signal has been input to the first comparator 68a and the second comparator 68b, the pulse ENC-A and the pulse ENC-B, which are digital signals, can be output respectively.

In the printer 10 of such a configuration, the light blocked by the light shielding section 54b is changed according to a position in the longitudinal direction of the transparent member 52. Therefore, the quantity of light received by the light receiving element 66 is also varied according to the position in the longitudinal direction of the substrate 64. As a result, electrical signals which are different in accordance with the position in the longitudinal direction of the substrate 64 can be output.

As shown in FIG. 6, the width W of the light transmitting section 54a allowing light, which is to be detected by the light receiving element 66, to pass therethrough becomes narrower as being closer to the end of the light receiving element array 65.

Therefore, the quantity of light received by the light receiving element 66 located in the center of the light receiving element array 65 becomes maximum. The quantity of light received by the light receiving element 66 located closer to the end of the light receiving element array 65 becomes smaller. At the end of the light receiving element array 65, as shown in FIG. 6, the width W of the light transmitting section 54a becomes smaller than the width of the light receiving element 66, so that the quantity of light received by the light receiving element 66 becomes minimum. As a result, the quantity of light that passes through the light transmitting section 54a can be decreased at the location where the quantity of light obliquely proceeding from the light emitter 61 is increased (i.e., at the longitudinal ends of the transparent member 52).

Therefore, the quantity of light received by the light receiving element 66, which is covered with the light shielding section 54b and should not originally receive light, can be reduced. As a result of a reduction in the quantity of light received by the light receiving element 66 covered with the light shielding section 54b, the detection sensitivity of the light receiving element 66 can be enhanced, and the accuracy of detection of an electrical signal output from the light receiving element 66 can be enhanced. Moreover, even when light is diffused or diffracted as a result of adhesion of ink mist to the back surface 52b or the like, the light receiving element 66 can inhibit receipt of such excessively diffused or diffracted light.

In addition, since the width of the light transmitting section 54a is decreased proportionally as being closer to the longitudinal end of the transparent member 52, and the light receiving elements 66 are arranged so as to assume a V-shaped line, the quantity of light received by the light receiving element 66 can be reduced stepwise, proportionally according to a position in the longitudinal direction of the substrate 64.

The mask pitch M at which the light transmitting sections 54a and the light shielding sections 54b are alternately iterated corresponds to the length of an even number of light receiving elements 66 in the longitudinal direction of the substrate 64 (the total width of two light receiving elements in FIG. 8, and the total length of four light receiving elements in FIGS. 9 and 10). Therefore, at least one of the light receiving elements 66 must be associated with each of the light transmitting sections 54a and the light shielding sections 54b. Accordingly, among these light receiving elements, the signals in which the phase is shifted by 180 degrees can be outputted, and it is possible to obtain an encoder signal having high accuracy by comparison between these signals.

Figure 13:
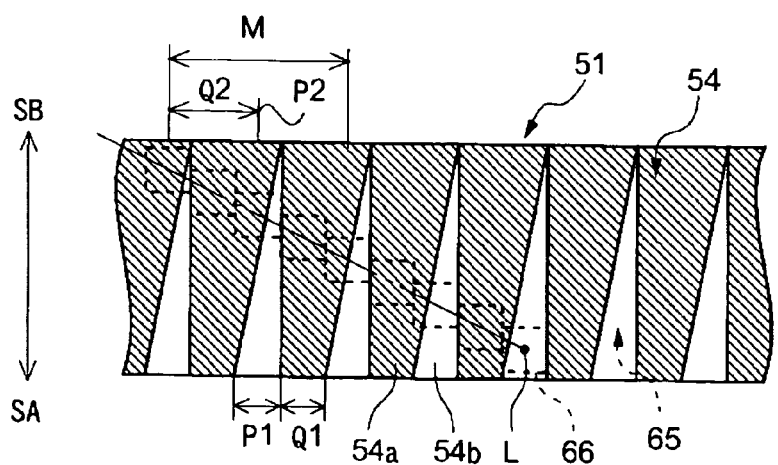
FIG. 13 is a schematic view showing a modified example of the linear scale.

In this embodiment, the light transmitting section 54a has a planer shape of an isosceles triangle. However, as shown in FIG. 13, the planar shape may also be a right-angled triangle. In this case, one of sides constituting the right-angled triangle other than a hypotenuse is preferably made parallel to the shorter edge of the transparent member 52, and aligned with a boundary between the adjacent light receiving elements 66. In order to reduce the quantity of light received by the light receiving elements 66 covered with the light shielding section 54b, the light receiving elements 66 are preferably obliquely rather than the V-shaped pattern.

In this embodiment, the line pattern 54 is provided only on the back face 52b of the transparent member 52. However, two or more line patterns may be provided. For example, a line pattern may be provided on each of the front face 52a and the back face 52b of the transparent member 52. Alternatively, two or more transparent members each of which is provided with a line pattern on either the front face or the back face thereof may be superposed one on another. Further, the line pattern may be provided inside the transparent member.

In the above, embodiment, the light receiving elements 66 are arranged so as to form a V-shaped line. However, the light receiving elements 66 may be arranged so as to form, for example, a trigonometric function curve, a quadric function curve, a tertiary function curve, an exponent function curve, the Fourier function curve formed by combination of various curves. In such a case, the shape of the light transmitting sections 54a may be configured accordingly.

In this embodiment, the linear encoder 50 is used as a position detector. However, the rotary encoder 70 may also be used as the position detector.

In the above embodiment, the printer 10 is exemplified as the liquid ejecting apparatus. However, the liquid ejecting apparatus may be any apparatus such as a color filter manufacturing apparatus, a dyeing machine, a micromachine, a semiconductor processing machine, a surface processing machine, a three-dimensional molding machine, a liquid vaporizing apparatus, an organic EL manufacturing apparatus (particularly, polymer EL manufacturing apparatus), a display manufacturing apparatus, a film coating system, and a DNA chip manufacturing apparatus. Here, liquid ejected from the apparatus is changed according to its purpose. For example, metal material, organic material, magnetic material, conductive material, wiring material, film coating material, and various processing liquid may be adopted.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Application No. 2005-281515 filed Sep. 28, 2006 including specification, drawings and claims is incorporated herein by reference in its entirety.

What is claimed is:

1. A liquid ejecting apparatus, comprising:
    a liquid ejecting head, operable to eject liquid toward a target medium;
    a light emitter, operable to emit light;
    a light receiver, adapted to receive the light emitted from the light emitter, and operable to output a signal in accordance with an amount of the received light, thereby detecting a position of the liquid ejecting head;
    a transparent member, elongated in a first direction and disposed between the light emitter and the light receiver;
    a line pattern, provided with the transparent member so as to oppose the light emitter, and including light transmitting sections and light shielding sections which are alternately arranged in the first direction with a first pitch, wherein:
    each of the light transmitting sections is adapted to allow the light emitted from the light emitter to pass through;
    each of the light shielding sections is adapted to shield the light emitted from the light emitter;
    a width of each of the light transmitting sections in the first direction is reduced as being closer to a first end of the transparent member than a second end of the transparent member relative to a second direction perpendicular to the first direction; and
    the light receiver comprises:
    a substrate, elongated in the first direction; and
    a plurality of light receiving elements, arrayed on the substrate, the light receiving elements being arranged in a v-shape, wherein an apex of the v-shape is located proximate to the second end of the transparent member in a vicinity of a center of the transparent member relative to the first direction.

2. The liquid ejecting apparatus as set forth in claim 1, wherein:
    the width of each of the light transmitting sections is proportionally reduced.

3. The liquid ejecting apparatus as set forth in claim 2, wherein:
    a shape of each of the light transmitting sections assumes an isosceles triangle.

4. The liquid ejecting apparatus as set forth in claim 2, wherein:
    a shape of each of the light transmitting sections assumes a right-angled triangle.

5. The liquid ejecting apparatus as set forth in claim 1, wherein:
    the first pitch corresponds to a dimension in the first direction of even numbers of the light receiving elements.

6. The liquid ejecting apparatus as set forth in claim 1, wherein:
    the liquid is pigment-base ink.

* * * * *